United States Patent
Sakurai et al.

(10) Patent No.: US 8,554,290 B2
(45) Date of Patent: Oct. 8, 2013

(54) PORTABLE ELECTRONIC APPARATUS HAVING CASINGS

(75) Inventors: Tomonori Sakurai, Kawasaki (JP); Chikara Kobayashi, Kato (JP); Jiro Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 62 days.

(21) Appl. No.: 13/291,178

(22) Filed: Nov. 8, 2011

(65) Prior Publication Data

US 2012/0113574 A1      May 10, 2012

(30) Foreign Application Priority Data

Nov. 10, 2010   (JP) ................................. 2010-252111

(51) Int. Cl.
*H04W 88/02*      (2009.01)

(52) U.S. Cl.
USPC .................................. 455/575.4; 361/679.01

(58) Field of Classification Search
USPC ........... 455/575.1, 575.4, 450.1; 361/679.26, 361/679.56, 679.55
See application file for complete search history.

(56) References Cited

U.S. PATENT DOCUMENTS

| | | | |
|---|---|---|---|
| 7,983,629 B2 * | 7/2011 | Park et al. | 455/90.3 |
| 8,218,307 B2 * | 7/2012 | Kajiwara et al. | 361/679.3 |
| 2009/0135555 A1 * | 5/2009 | Komine et al. | 361/679.26 |
| 2010/0035670 A1 * | 2/2010 | Mine | 455/575.4 |
| 2010/0099468 A1 * | 4/2010 | Huang et al. | 455/575.4 |
| 2010/0184492 A1 * | 7/2010 | Kim et al. | 455/575.4 |
| 2011/0092259 A1 * | 4/2011 | Liu et al. | 455/575.4 |
| 2011/0143825 A1 * | 6/2011 | Ahn et al. | 455/575.4 |

FOREIGN PATENT DOCUMENTS

| | | |
|---|---|---|
| JP | 2006-93999 A | 4/2006 |
| JP | 2008-193630 A | 8/2008 |
| JP | 2010-239321 A | 10/2010 |

OTHER PUBLICATIONS

Korean Office Action mailed Oct. 12, 2012 for corresponding Korean Application No. 10-2011-116361, with Partial English-language Translation.

* cited by examiner

*Primary Examiner* — Kamran Afshar
*Assistant Examiner* — Khawar Iqbal
(74) *Attorney, Agent, or Firm* — Fujitsu Patent Center (57) ABSTRACT

A portable electronic apparatus includes a first casing, a second casing movably connected to the first casing, a first elastic member provided on a surface of the second casing facing the first casing and a second elastic member provided on a surface of the first casing facing the second casing. The second elastic member includes a convex portion that elastically contacts with the first elastic member in a closed state in which the first casing and the second casing are superposed.

4 Claims, 14 Drawing Sheets

PORTABLE ELECTRONIC APPARATUS HAVING CASINGS

CROSS-REFERENCE TO RELATED APPLICATIONS

This application is based upon and claims the benefit of priority of the prior Japanese Patent Application No. 2010-252111, filed on Nov. 10, 2010, the entire contents of which are incorporated herein by reference.

FIELD

The embodiment discussed herein is related to a portable electronic apparatus having casings.

BACKGROUND

In a portable electronic apparatus, such as a mobile telephone, of the related art, two casings are connected movably to each other. The two casings are connected by a moving mechanism such as a slide mechanism including a slider. By sliding the slider relative to another component, the two casings are slid relative to each other. In general, a gap is formed between the slider and the component so that the slider smoothly slides relative to the component. This gap causes relative backlash between the two casings.

Japanese Laid-open Patent Publication No. 2006-93999 proposes a technique that suppresses relative backlash between two casings. One of the casings is provided with grooves extending in the longitudinal direction and the other casing is provided with ribs extending through the grooves.

SUMMARY

According to an aspect of an embodiment, a portable electronic apparatus includes a first casing, a second casing movably connected to the first casing, a first elastic member provided on a surface of the second casing facing the first casing and a second elastic member provided on a surface of the first casing facing the second casing. The second elastic member includes a convex portion that elastically contacts with the first elastic member in a closed state in which the first casing and the second casing are superposed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment of a portable electronic apparatus disclosed in the present application will be described in detail below with reference to the drawings. The embodiment is not intended to limit an electronic apparatus disclosed in the present application. For example, while a mobile telephone is given as an example of an electronic apparatus in the following embodiment, the embodiment is also applicable to other electronic apparatuses such as a personal digital assistant (PDA).

Figure 1:
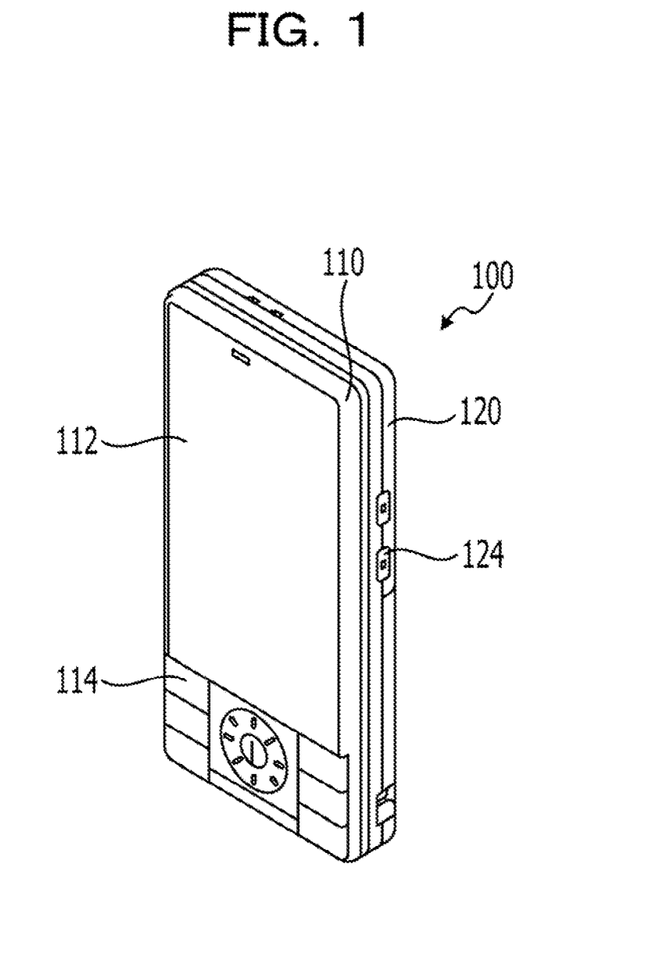
FIG. 1 is an external perspective view of a mobile telephone according to an embodiment in which a display-side casing is closed without being slid.
Figure 2:
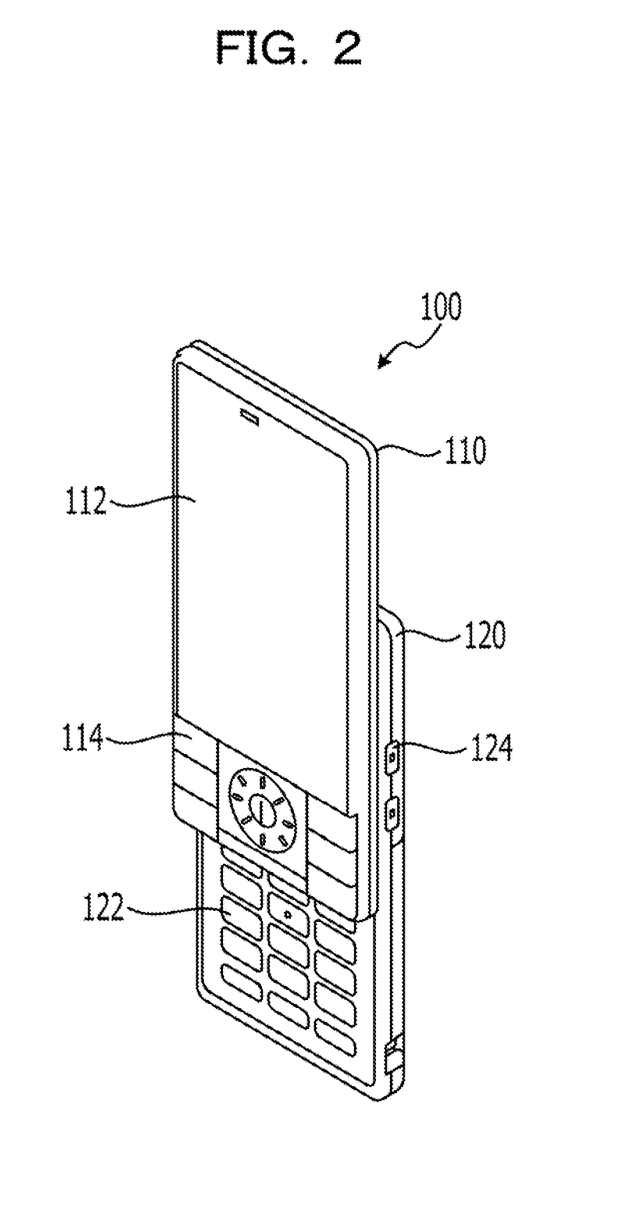
FIG. 2 is an external perspective view of the mobile telephone of the embodiment in which the display-side casing is slid open.
Figure 3:
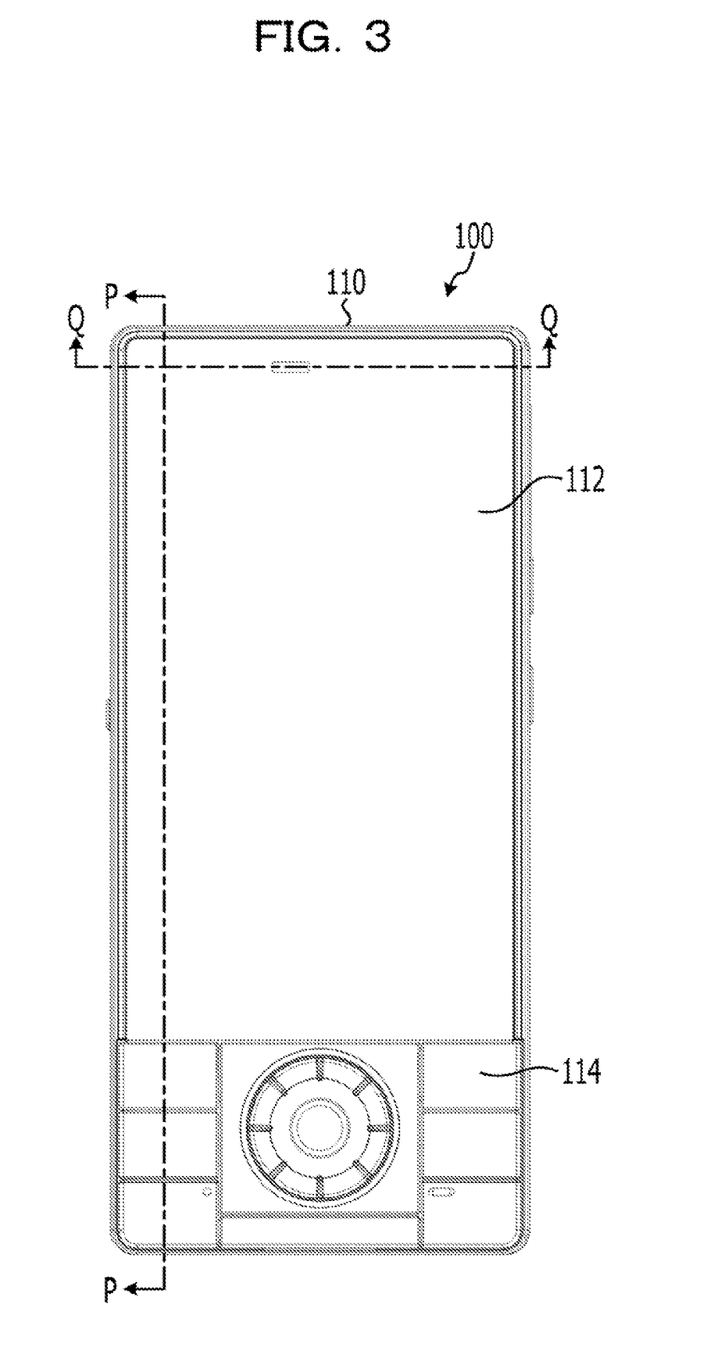
FIG. 3 is a plan view of the mobile telephone of the embodiment in which the display-side casing is closed without being slid.

FIG. 1 is an external perspective view of a mobile telephone 100 according to the embodiment in which a display-side casing is closed without being slid. FIG. 2 is an external perspective view of the mobile telephone 100 of the embodiment in which the display-side casing is slid open. FIG. 3 is a plan view of the mobile telephone 100 of the embodiment in which the display-side casing is closed without being slid.

As illustrated in FIGS. 1 to 3, the mobile telephone 100 of the embodiment includes a display-side casing 110 and an operation-side casing 120. The display-side casing 110 includes a display unit 112 such as a liquid crystal display (LCD), and an operation unit 114 having a plurality of keys used for various operations of the mobile telephone 100. In contrast, the operation-side casing 120 includes an operation unit 122 having a plurality of keys used for various operations of the mobile telephone 100. On a side face of the operation-side casing 120, operation keys 124 are provided, for example, to control the call volume.

The display-side casing 110 and the operation-side casing 120 are connected by a slide mechanism (not illustrated) in a manner such as to slide relative to each other. FIG. 1 illustrates a closed state in which the display-side casing 110 is not slid, but is entirely superposed on the operation-side casing 120. FIG. 2 illustrates an open state in which the display-side casing 110 is slid to overlap with the operation-side casing 120 in the minimum overlapping area. In general, during use, the mobile telephone 100 of such a slide type is set in an open state in which the display-side casing 110 and the operation-side casing 120 overlap in the minimum overlapping area. In the open state, the operation unit 122 of the operation-side casing 120 is exposed outside. In contrast, during non-use, the mobile telephone 100 of the slide type is set in a closed state in which the display-side casing 110 and the operation-side casing 120 are superposed entirely. In the closed state, the operation unit 122 of the operation-side casing 120 is covered with the display-side casing 110.

Figure 4:
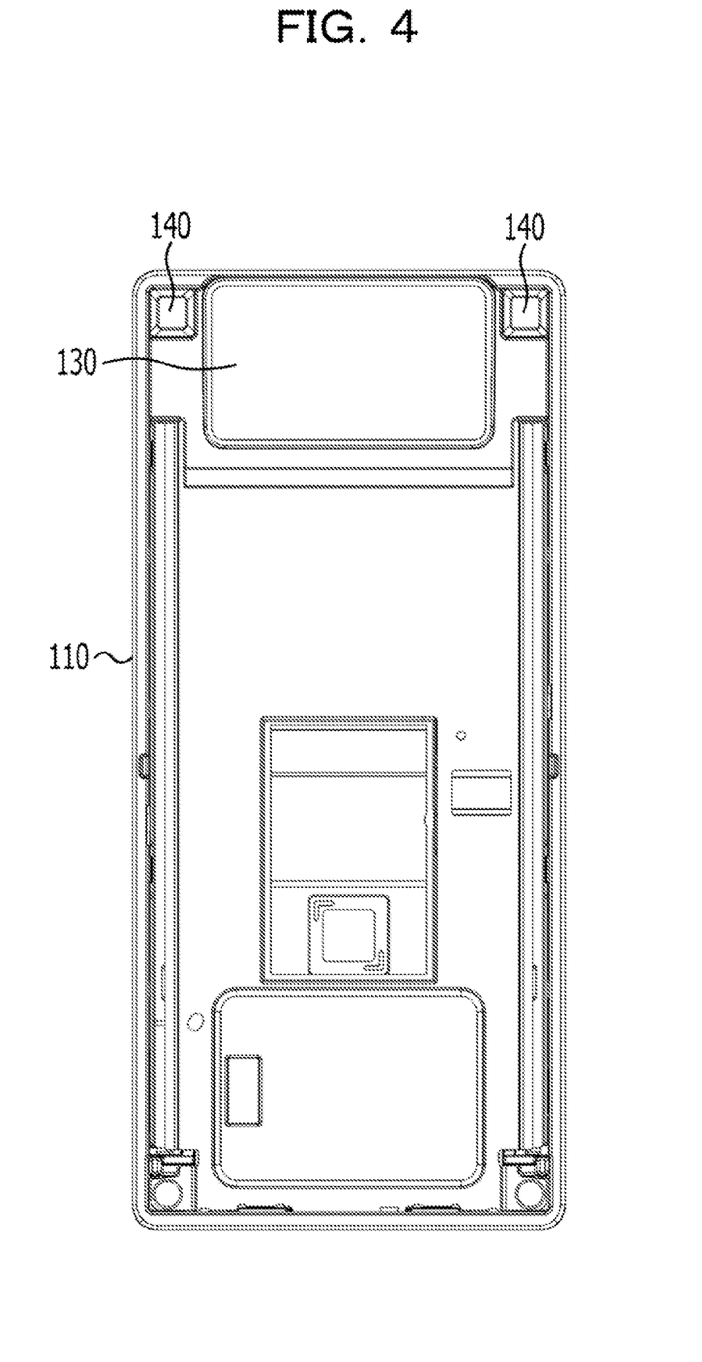
FIG. 4 is a plan view of the display-side casing, viewed from a side of an operation-side casing.
Figure 5:
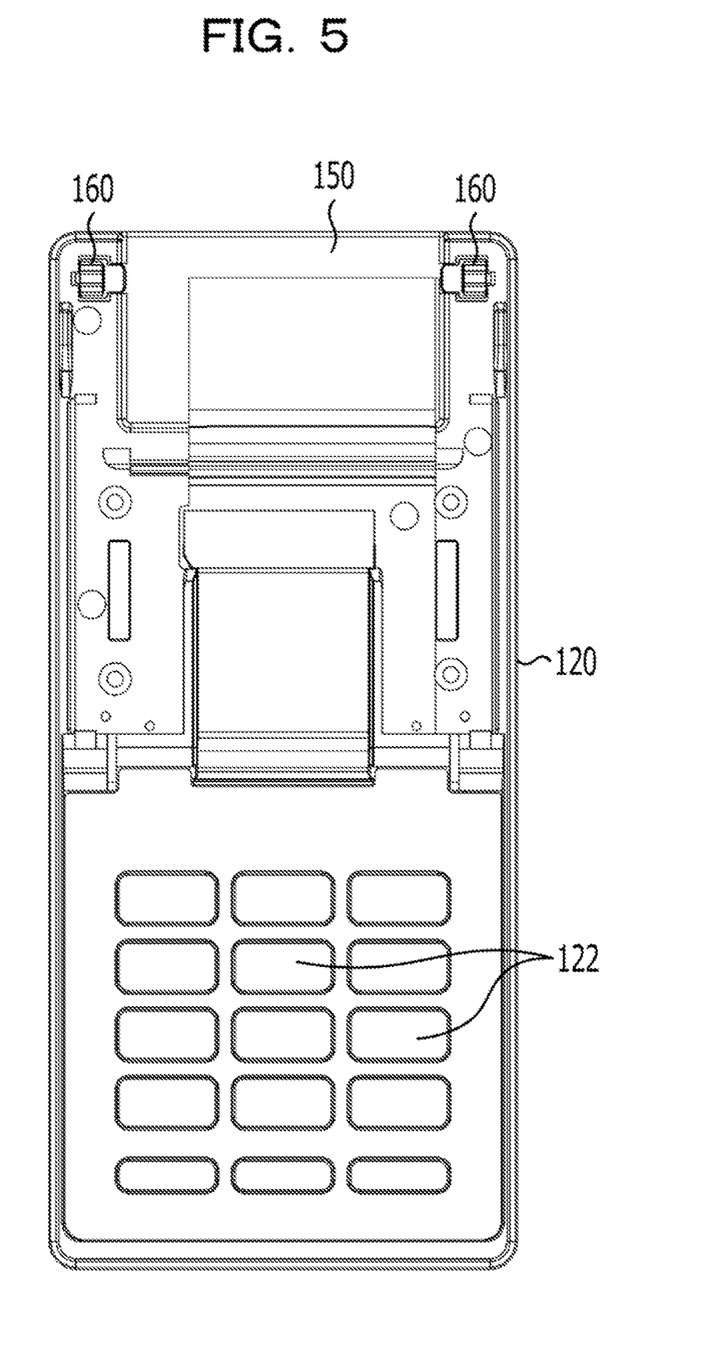
FIG. 5 is a plan view of the operation-side casing, viewed from a side of the display-side casing.

Next, a detailed description will be given of opposing surfaces of the display-side casing 110 and the operation-side casing 120 in a closed state of the mobile telephone 100. FIG. 4 is a plan view of the display-side casing 110, viewed from the operation-side casing 120 side. FIG. 5 is a plan view of the operation-side casing 120, viewed from the display-side casing 110 side. In FIGS. 4 and 5, the slide mechanism for connecting the display-side casing 110 and the operation-side casing 120 is not illustrated.

As illustrated in FIG. 4, a surface of the display-side casing 110 facing the operation-side casing 120 is substantially rectangular. On one short side of the surface of the display-side casing 110 facing the operation-side casing 120, a bulging portion 130 is provided to bulge toward the operation-side casing 120. An inner space of the bulging portion 130 stores various components such as a speaker and a camera module. Further, at both end corners of the one short side of the surface of the display-side casing 110 facing the operation-side casing 120, first elastic members 140 are provided such that the bulging portion 130 is located therebetween.

In contrast, as illustrated in FIG. 5, a surface of the operation-side casing 120 facing the display-side casing 110 is substantially rectangular. On one short side of the surface of the operation-side casing 120 facing the display-side casing 110, a recess 150 is provided to recede away from the display-side casing 110. In a closed state, the recess 150 receives the bulging portion 130 of the display-side casing 110. Further, at both end corners of the one short side of the surface of the operation-side casing 120 facing the display-side casing 110, second elastic members 160 are provided such that the recess 150 is located therebetween.

Figure 6:
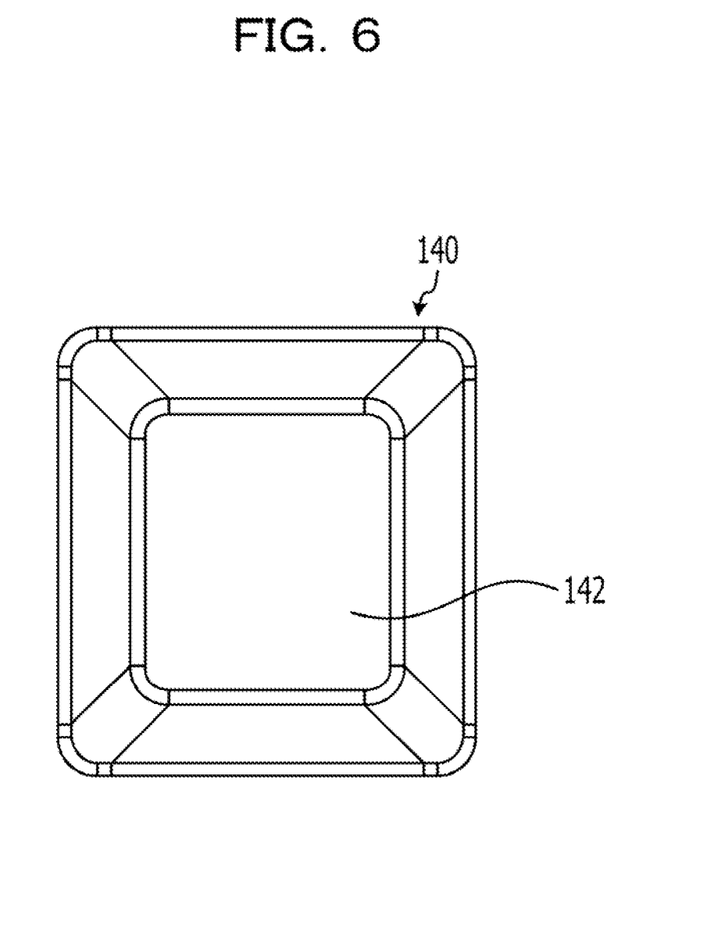
FIG. 6 is an enlarged plan view of a first elastic member.
Figure 7:
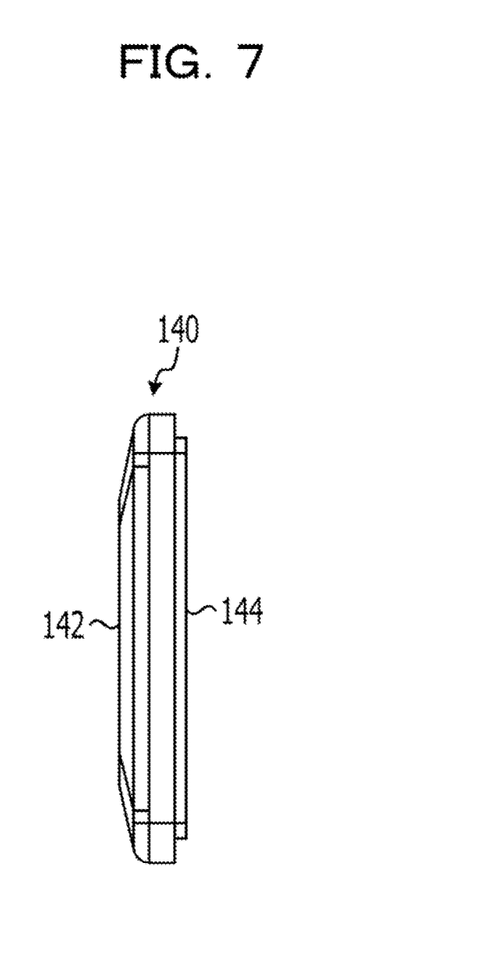
FIG. 7 is a side view of the first elastic member illustrated in FIG. 6.
Figure 8:
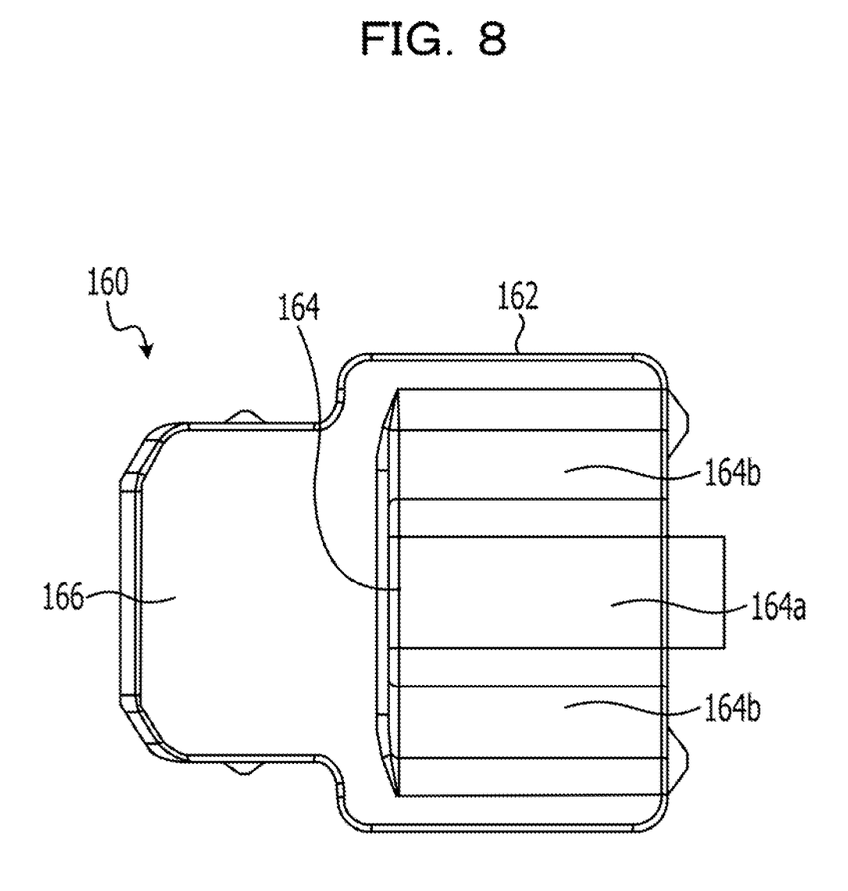
FIG. 8 is an enlarged plan view of a second elastic member.
Figure 9:
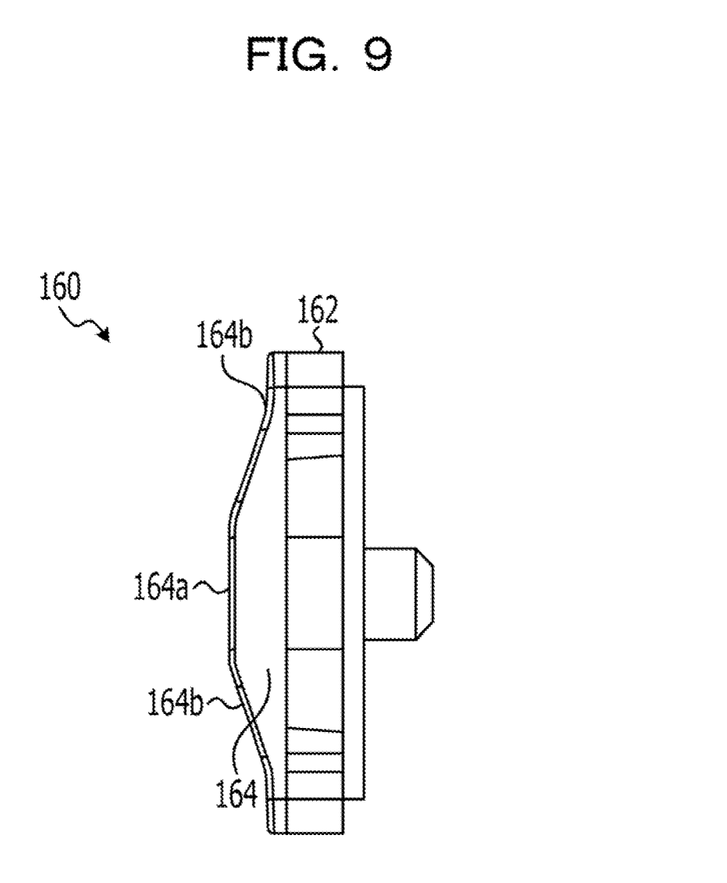
FIG. 9 is a side view of the second elastic member illustrated in FIG. 8.

The first elastic members 140 and the second elastic members 160 will be described in detail. FIG. 6 is an enlarged plan view of each first elastic member 140. FIG. 7 is a side view of the first elastic member 140 illustrated in FIG. 6. FIG. 8 is an enlarged plan view of each second elastic member 160. FIG. 9 is a side view of the second elastic member 160 illustrated in FIG. 8. FIG. 6 is an enlarged plan view of each of the first elastic members 140 illustrated in FIG. 4, and FIG. 8 is an enlarged plan view of each of the second elastic members 160 illustrated in FIG. 5.

As illustrated in FIGS. 6 and 7, the first elastic member 140 is formed of an elastic material such as elastomer, and is shaped like or substantially similar to a plate having a substantially trapezoidal profile. The first elastic member 140 is provided on the surface of the display-side casing 110 facing the operation-side casing 120. An upper surface 142 of the first elastic member 140 facing the operation-side casing 120 is flat.

In contrast, as illustrated in FIGS. 8 and 9, the second elastic member 160 is formed of an elastic material such as elastomer, and is provided on the surface of the operation-side casing 120 facing the display-side casing 110. The second elastic member 160 includes a substantially rectangular base portion 162, a convex portion 164 extending from the base portion 162 toward the display-side casing 110, and a projecting portion 166 projecting outward from an outer peripheral surface of the base portion 162.

Figure 10:
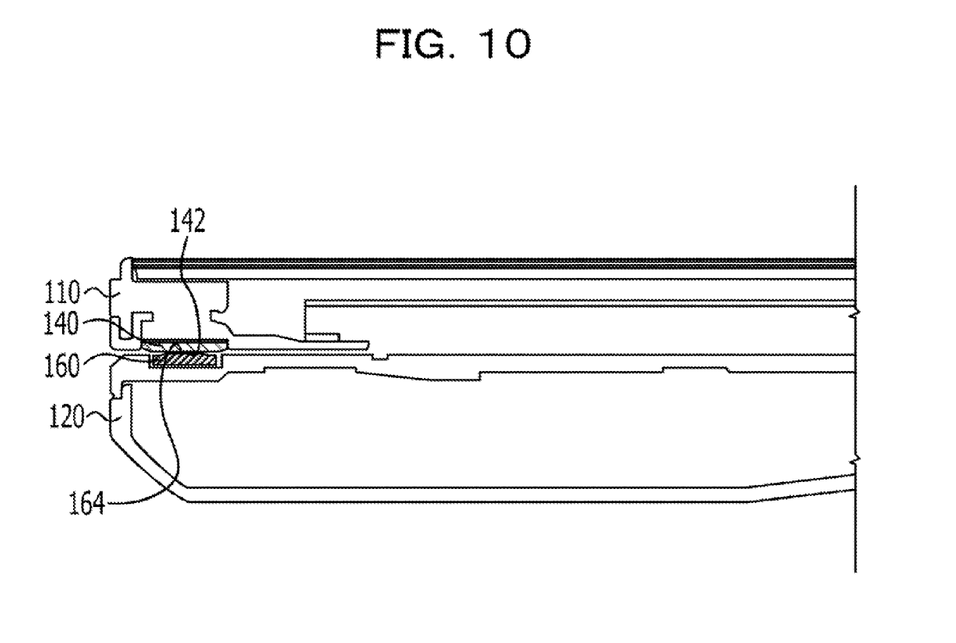
FIG. 10 is a cross-sectional view of the mobile telephone, taken along line P-P of FIG. 3.
Figure 11:
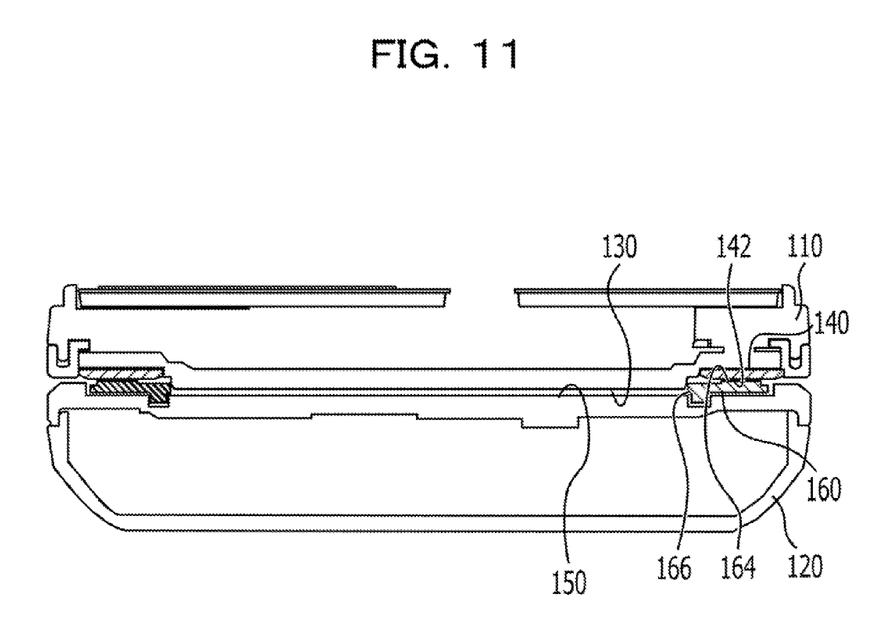
FIG. 11 is a cross-sectional view of the mobile telephone, taken along line Q-Q of FIG. 3.

Next, a description will be given of setting states of the first elastic member 140 and the second elastic member 160 in a closed state of the mobile telephone 100. FIG. 10 is a cross-sectional view of the mobile telephone 100, taken along line P-P of FIG. 3. FIG. 11 is a cross-sectional view of the mobile telephone 100, taken along Q-Q of FIG. 3.

As illustrated in FIGS. 10 and 11, the first elastic member 140 is stuck in a depression provided in the surface of the display-side casing 110 facing the operation-side casing 120. In a closed state of the mobile telephone 100, the first elastic member 140 is located at a position corresponding to the second elastic member 160 of the operation-side casing 120.

In contrast, the second elastic member 160 is stuck in a depression provided in the surface of the operation-side casing 120 facing the display-side casing 110. In the closed state of the mobile telephone 100, the second elastic member 160 is located at a position corresponding to the first elastic member 140 of the display-side casing 110.

In the closed state of the mobile telephone 100, the convex portion 164 of the second elastic member 160 is in elastic contact with the upper surface 142 of the first elastic member 140, whereby the convex portion 164 of the second elastic member 160 applies elastic pressing force to the first elastic member 140 and receives elastic repulsive force from the first elastic member 140. A top portion 164a of the convex portion 164 in elastic contact with the upper surface 142 of the first elastic member 140 is shaped like or substantially similar to a flat surface in correspondence with the upper surface 142 of the first elastic member 140. Thus, the top portion 164a of the convex portion 164 can be in surface contact with the upper surface 142 of the first elastic member 140, and this allows elastic pressing force to be efficiently applied to the first elastic member 140. Side face portions 164b of the convex portion 164 are inclined such as not to directly contact with the upper surface 142 of the first elastic member 140. This prevents a slide of the display-side casing 110 from being obstructed by direct contact of the side face portions 164b of the convex portion 164 with the first elastic member 140 made when the display-side casing 110 is slid and the mobile telephone 100 shifts from an open state to a closed state or from a closed state to an open state.

In the closed state of the mobile telephone 100, the projecting portion 166 of the second elastic member 160 is located adjacent to a side face of the bulging portion 130 provided in the display-side casing 110. While a distance between the side face of the bulging portion 130 and the projecting portion 166 adjacent thereto can be appropriately selected such that the projecting portion 166 does not directly contact with the side face of the bulging portion 130, for example, the distance can be set at 0.05 mm or less. Since the projecting portion 166 of the second elastic member 160 is thus adjacent to the side face of the bulging portion 130 of the display-side casing 110, it can contact with the bulging portion 130 of the display-side casing 110 that is displaced when the elastic contact between the convex portion 164 and the first elastic member 140 is released.

Figure 12:
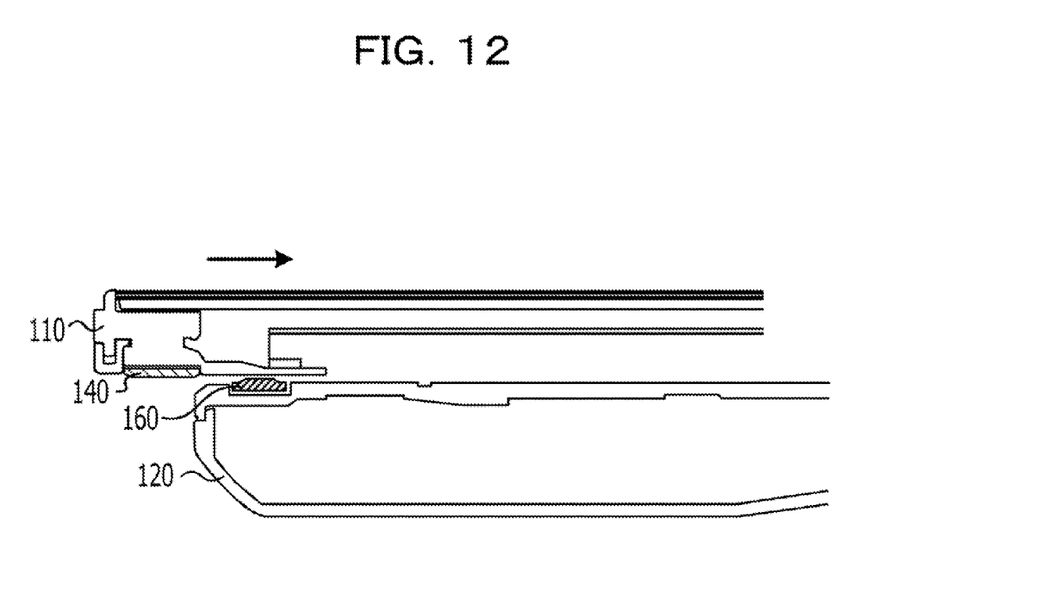
FIG. 12 illustrates an open state of the mobile telephone in which the first elastic member and the second elastic member are out of contact with each other.
Figure 13:
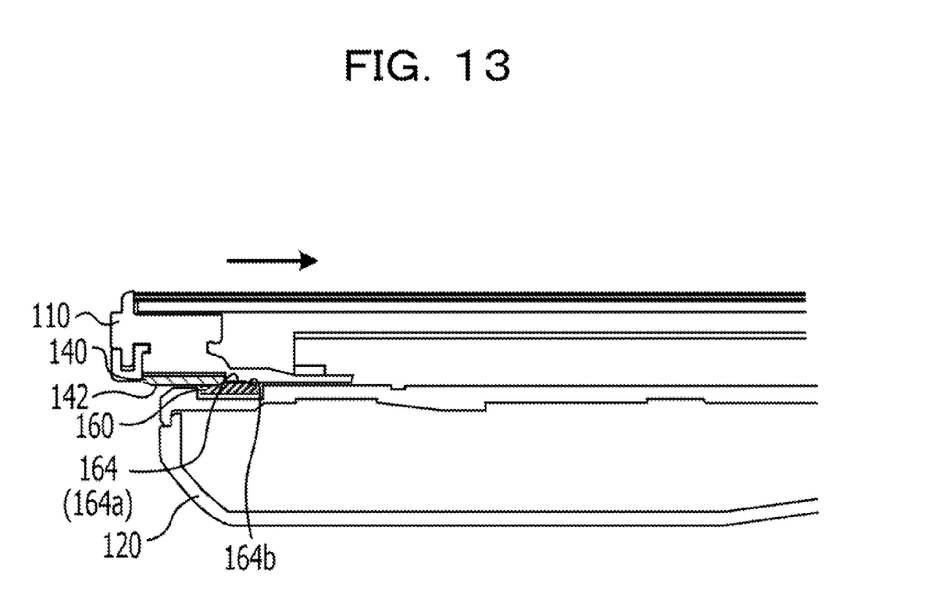
FIG. 13 illustrates a state in which the first elastic member contacts with the second elastic member immediately before the mobile telephone shifts from an open state to a closed state.
Figure 14:
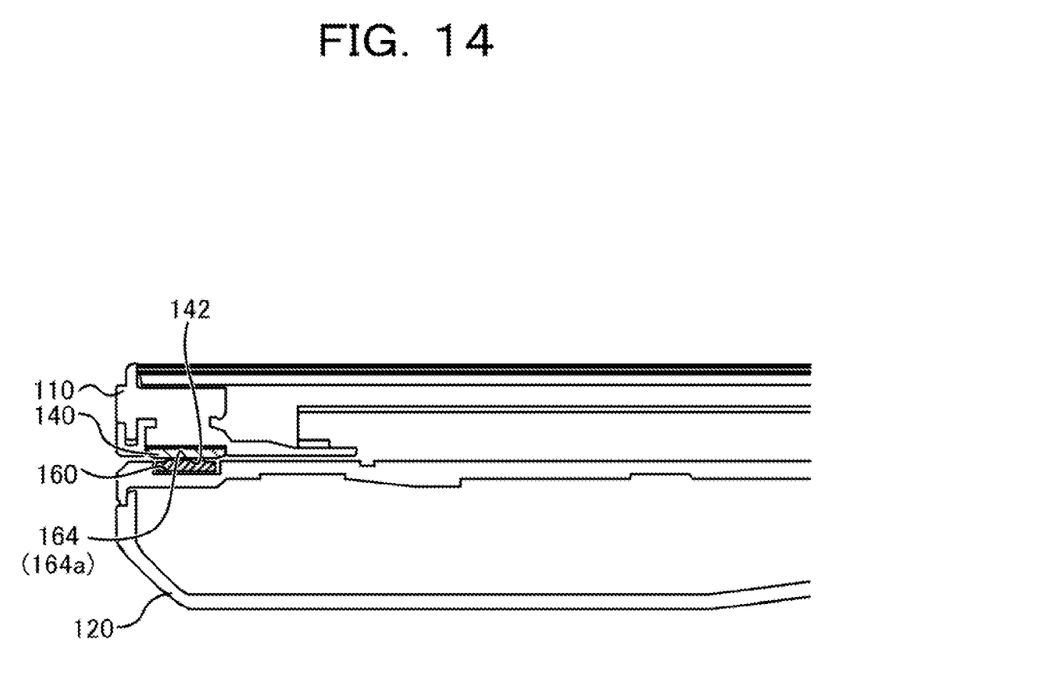
FIG. 14 illustrates a closed state of the mobile telephone in which the first elastic member and the second elastic member are in contact with each other.

Next, a description will be given of how the first elastic member 140 and the second elastic member 160 contact with each other when the mobile telephone 100 shifts from an open state to a closed state. FIG. 12 illustrates an open state of the mobile telephone 100 in which the first elastic member 140 and the second elastic member 160 are out of contact with each other. FIG. 13 illustrates a state in which the first elastic member 140 contacts with the second elastic member 160 immediately before the mobile telephone 100 shifts from an open state to a closed state. FIG. 14 illustrates a closed state of the mobile telephone 100 in which the first elastic member 140 and the second elastic member 160 are in contact with each other.

As illustrated in FIG. 12, in an open state in which the display-side casing 110 slides and overlaps with the operation-side casing 120 in the minimum overlapping area, the first elastic member 140 of the display-side casing 110 is out of contact with the second elastic member 160 of the operation-side casing 120.

By sliding the display-side casing 110 in the longitudinal direction relative to the operation-side casing 120, as illustrated in FIG. 13, the mobile telephone 100 is brought into a state immediately before it shifts from the open state of FIG. 12 to a closed state. In the state of FIG. 13, the convex portion 164 of the second elastic member 160 starts to elastically contact with the upper surface 142 of the first elastic member 140. Then, the top portion 164a of the convex portion 164 of the second elastic member 160 applies elastic pressing force to the upper surface 142 of the first elastic member 140, and receives elastic repulsive force from the upper surface 142, so that the convex portion 164 starts elastic deformation. At this time, the side face portions 164b of the convex portion 164 do not contact with the upper surface 142 of the first elastic member 140.

Next, as illustrated in FIG. 14, in the closed state in which the display-side casing 110 and the operation-side casing 120 are entirely superposed, the convex portion 164 of the second elastic member 160 elastically contacts with the upper surface 142 of the first elastic member 140 in the maximum contact area. Then, the top portion 164a of the convex portion 164 of the second elastic member 160 is brought into surface contact with the upper surface 142 of the first elastic member 140 to apply the maximum pressing force to the upper surface 142 and receives the maximum repulsive force from the upper surface 142. Thus, forces in opposite directions act on the display-side casing 110 and the operation-side casing 120, and these forces position and fix the display-side casing 110 and the operation-side casing 120. This efficiently suppresses backlash between the display-side casing 110 and the operation-side casing 120. Further, since the convex portion 164 of the second elastic member 160 elastically contacts with the upper surface 142 of the first elastic member 140, the display-side casing 110 and the operation-side casing 120 can be prevented from breakage.

As described above, in the embodiment, the convex portion 164 of the second elastic member 160 provided in the operation-side casing 120 is in elastic contact with the first elastic member 140 provided in the display-side casing 110 in a closed state in which the display-side casing 110 and the operation-side casing 120 are superposed in a stationary manner. For this reason, according to the embodiment, backlash between the two casings can be efficiently suppressed while preventing the casings from breakage. When the ribs of one of the two casings extend through the grooves of the other casing, as disclosed in Japanese Laid-open Patent Publication No. 2006-93999 described above, small gaps are provided between the grooves and the ribs so that one of the casings smoothly slides relative to the other casing. The small gaps between the grooves and the ribs may cause backlash between the two casings. In contrast, according to the embodiment, such backlash does not occur.

Further, in the embodiment, the top portion 164a of the convex portion 164 to elastically contact with the first elastic member 140 is shaped like or substantially similar to a flat surface. For this reason, according to the embodiment, since the top portion 164a of the convex portion 164 can make surface contact with the upper surface 142 of the first elastic member 140, elastic pressing force can be efficiently applied to the first elastic member 140. As a result, backlash between the two casings can be suppressed more efficiently.

Further, the side face portions 164b of the convex portion 164 are each shaped like or substantially similar to an inclined surface. For this reason, according to the embodiment, a slide of the display-side casing 110 is prevented from being obstructed by direct contact of the side face portions 164b of the convex portion 164 with the first elastic member 140.

In addition, in the embodiment, the second elastic member 160 includes the projecting portion 166 that is to be located adjacent to the side face of the bulging portion 130 provided in the display-side casing 110. For this reason, according to the embodiment, the projecting portion 166 can contact with the bulging portion 130 of the display-side casing 110 that is displaced when the elastic contact between the convex portion 164 and the first elastic member 140 is released. This can minimize backlash between the two casings.

OTHER EMBODIMENTS

While the embodiment of the present invention has been described above, the present invention can be carried out by other various embodiments within the technical field described in the claims.

That is, while the mobile telephone of the embodiment is of a slide type using the slide mechanism that slidably connects the display-side casing 110 and the operation-side casing 120, the electronic apparatus disclosed in the present application is also applicable to mobile telephones different from the slide type. For example, the electronic apparatus disclosed in the present application is similarly applicable to a folding or planar-rotation type mobile telephone including a connecting mechanism that allows one casing to move relative to the other casing.

Further, while the electronic apparatus is applied to the mobile telephone in the embodiment, the electronic apparatus disclosed in the present application is not limited thereto. For example, the electronic apparatus disclosed in the present application is also applicable to other various electronic apparatuses, for example, a small information processing terminal such as a PDA, a small music player, a portable television, and a portable game machine.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A portable electronic apparatus comprising:
a first casing;
a second casing movably connected to the first casing;
a first elastic member provided on a surface of the second casing facing the first casing; and
a second elastic member provided on a surface of the first casing facing the second casing, the second elastic member including a convex portion that elastically contacts with the first elastic member in a closed state in which the first casing and the second casing are superposed, wherein
the surface of the second casing facing the first casing has a bulging portion bulging toward the first casing, and
the second elastic member further includes a projecting portion that is located adjacent to a side face of the bulging portion in the closed state.

2. The portable electronic apparatus according to claim 1, wherein a top portion of the convex portion that elastically contacts with the first elastic member is shaped substantially similar to a flat surface.

3. The portable electronic apparatus according to claim 1, wherein a side face portion of the convex portion that elastically contacts with the first elastic member is shaped substantially similar to an inclined surface.

4. The portable electronic apparatus according to claim 1, wherein a distance between the side face of the bulging portion and the projecting portion is 0.05 mm or less.

* * * * *